US010377327B1

(12) United States Patent
Katoh et al.

(10) Patent No.: US 10,377,327 B1
(45) Date of Patent: Aug. 13, 2019

(54) CURVATURE REGULATING MEMBER AND POWER SUPPLY DEVICE

(71) Applicant: Yazaki Corporation, Tokyo (JP)

(72) Inventors: Mitsunobu Katoh, Shizuoka (JP); Tsukasa Sekino, Shizuoka (JP); Tatsuya Otsuka, Shizuoka (JP); Masaki Yokoyama, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 0 days.

(21) Appl. No.: 16/238,205

(22) Filed: Jan. 2, 2019

(30) Foreign Application Priority Data

Feb. 20, 2018 (JP) ................................ 2018-027866

(51) Int. Cl.

*H02G 3/04* (2006.01)
*B60R 16/02* (2006.01)
*B60R 16/027* (2006.01)

(52) U.S. Cl.

CPC ........ *B60R 16/0215* (2013.01); *B60R 16/027* (2013.01); *H02G 3/0462* (2013.01)

(58) Field of Classification Search

USPC ........................................................ 174/72 A
See application file for complete search history.

(56) References Cited

U.S. PATENT DOCUMENTS 2,684,512 A * 7/1954 Beman ................. H01B 7/0045 174/72 A
3,060,972 A * 10/1962 Sheldon ............... A61B 1/0055 138/120
3,082,984 A * 3/1963 Larsson .................... F16L 3/13 174/72 A
3,318,429 A * 5/1967 Burns ...................... B41J 2/265 101/93.05
3,321,571 A * 5/1967 Lynch .................... H02G 3/045 174/101
3,330,105 A * 7/1967 Weber .................. B23Q 1/0009 138/120
3,363,050 A * 1/1968 Martin .................. H02G 3/045 138/155

(Continued)

FOREIGN PATENT DOCUMENTS

JP 2016-136809 A 7/2016

*Primary Examiner* — William H. Mayo, III
*Assistant Examiner* — Krystal Robinson
(74) *Attorney, Agent, or Firm* — Sughrue Mion, PLLC

(57) ABSTRACT

A curvature regulating member includes a plurality of member pieces to be arranged along a wire harness and a flexible connecting part connecting adjacent member pieces. The adjacent member pieces are configured to contact each other, thereby regulating curvature of the wire harness on an X-Y plane. Each member piece includes a recessed part recessed toward a direction away from an adjacent member piece on one side, and a second protrusion configured to be inserted in the recessed part provided on an adjacent member piece on another side when adjacent member pieces contact each other. The recessed part includes a slanted face extending away from the adjacent member piece on the one side as leaving from both ends in a widthwise direction. The second protrusion includes a slanted face extending toward the adjacent member piece on the another side as leaving from both ends in the widthwise direction.

4 Claims, 6 Drawing Sheets

(56) References Cited

U.S. PATENT DOCUMENTS

| | | | | | |
|---|---|---|---|---|---|
| 3,485,937 | A * | 12/1969 | Caveney | H02G 3/045 | 174/101 |
| 3,664,619 | A * | 5/1972 | Heidrich et al. | F16G 13/16 | 248/51 |
| 3,772,875 | A * | 11/1973 | Viano | F16G 13/16 | 198/851 |
| 4,228,825 | A * | 10/1980 | Moritz | F16L 3/015 | 138/120 |
| 4,840,023 | A * | 6/1989 | Borsani | F16G 13/10 | 248/49 |
| 5,038,556 | A * | 8/1991 | Moritz | F16G 13/16 | 248/49 |
| 5,134,251 | A * | 7/1992 | Martin | G02B 6/4461 | 138/110 |
| 5,197,767 | A * | 3/1993 | Kimura | F16G 13/10 | 138/120 |
| 5,778,939 | A * | 7/1998 | Hok-Yin | A47L 9/24 | 138/109 |
| 5,836,148 | A * | 11/1998 | Fukao | F16G 13/16 | 59/78.1 |
| 5,900,586 | A * | 5/1999 | Carr | A47B 21/06 | 174/95 |
| 5,918,837 | A * | 7/1999 | Vicain | H02G 3/26 | 174/135 |
| 6,433,282 | B1 * | 8/2002 | Traversa | H02G 3/0475 | 138/118 |
| 6,470,129 | B1 * | 10/2002 | Wentworth | H02G 3/0437 | 385/134 |
| 6,695,014 | B2 * | 2/2004 | Blase | F16G 13/16 | 138/120 |
| 6,708,480 | B1 * | 3/2004 | Wehler | F16G 13/16 | 248/49 |
| 7,082,720 | B2 * | 8/2006 | Kobayashi | B60R 16/0215 | 49/360 |
| 7,240,477 | B1 * | 7/2007 | Dunfee | F16G 13/16 | 248/49 |
| 7,310,937 | B2 * | 12/2007 | Kim | F16G 13/16 | 248/49 |
| 7,428,808 | B2 * | 9/2008 | Utaki | H02G 11/006 | 248/49 |
| 7,513,097 | B2 * | 4/2009 | Utaki | F16G 13/16 | 248/49 |
| 7,610,744 | B2 * | 11/2009 | Hart | F16G 13/12 | 248/49 |
| 7,637,092 | B2 * | 12/2009 | Utaki | F16G 13/16 | 248/49 |
| 8,505,272 | B1 * | 8/2013 | Komiya | H02G 11/006 | 248/49 |
| 8,882,052 | B2 * | 11/2014 | Komiya | F16G 13/20 | 248/51 |
| 9,570,895 | B2 * | 2/2017 | Lu | H02G 3/0475 | |
| 9,573,536 | B2 * | 2/2017 | Katou | B60N 2/06 | |
| 2001/0025715 | A1 * | 10/2001 | Muller | F16G 13/16 | 174/19 |
| 2004/0112625 | A1 * | 6/2004 | Sheikholeslami | F16G 13/16 | 174/68.1 |
| 2007/0158092 | A1 * | 7/2007 | Ogawa | B60J 5/06 | 174/19 |
| 2015/0102182 | A1 * | 4/2015 | Sekino | B60R 16/0215 | 248/70 |
| 2015/0360629 | A1 * | 12/2015 | Sekino | B60R 16/0215 | 174/68.3 |
| 2016/0218496 | A1 * | 7/2016 | Terada | B60R 16/027 | |

* cited by examiner

CURVATURE REGULATING MEMBER AND POWER SUPPLY DEVICE

FIELD OF THE INVENTION

The present invention relates to a curvature regulating member for regulating curvature of a wire harness and to a power supply device applied with the curvature regulating member.

BACKGROUND

One example of the conventional curvature regulating member as described above is shown for example in Patent Literature 1 mentioned below. FIG. 9 shows a curvature regulating member 10 shown in Patent Literature 1. As shown, the curvature regulating member 10 is arranged along a wire harness 20 and is configured to regulate the wire harness 20 so that the wire harness 20 is not curved with a radius of curvature that is equal to or less than a reference radius. The curvature regulating member 10 includes a plurality of curved parts 11 curved with the reference radius, and a connecting hinge 12 (connecting part) connecting the curved parts 11. The plurality of curved parts 11 is arranged along the wire harness 20 and formed with a substantially U-shaped cross-section. The connecting hinge 12 is configured to connect outer sides of the curved shapes of the curved parts 11.

In the above-described conventional curvature regulating member 10, when the curvature regulating member 10 is curved, the adjacent curved parts 11 abut on each other, as shown in FIG. 9. Upon application of load in a widthwise direction, the adjacent curved parts 11 may be displaced in the widthwise direction with respect to each other, and this could lead to damage to the connecting hinge 12.

Patent Literature 1: JP 2016-136809 A

SUMMARY OF THE INVENTION

In view of the above-described background, it is an object of the present invention to provide a curvature regulating member which can reduce damage to a connecting part, and a power supply device including the curvature regulating member.

To achieve the above-mentioned object, the present invention according to a first aspect provides a curvature regulating member including a plurality of member pieces to be arranged along a wire harness, and a flexible connecting part connecting adjacent member pieces, wherein the adjacent member pieces are configured to contact each other and thereby regulate curvature of the wire harness on a predetermined plane, wherein each of the member pieces includes a recessed part and a projected part, the recessed part being recessed in a direction away from an adjacent member piece located on one side in a longitudinal direction of the wire harness, the projected part being configured to be inserted in the recessed part provided to an adjacent member piece located on another side in the longitudinal direction of the wire harness, wherein the recessed part includes a slanted face extending away from the adjacent member piece located on the one side in the longitudinal direction as leaving from both ends of the recessed part in a widthwise direction, the widthwise direction being perpendicular to both of the longitudinal direction and a height direction perpendicular to the plane, and wherein the projected part includes a slanted face extending toward the adjacent member piece located on the another side in the longitudinal direction as leaving from both ends of the projected part in the widthwise direction.

A distance in the widthwise direction between the connecting part and a bottom point of the recessed part may be equal to a distance in the widthwise direction between the connecting part and an apex of the projected part.

The present invention according to another aspect provides a power supply device configured to electrically connect a vehicle body and a sliding member that are included in a vehicle, including a wire harness to be wired between the vehicle body and the sliding member, and the curvature regulating member as described above arranged along the wire harness.

According to the present invention described above, each of the adjacent member pieces includes the recessed part and the projected part. Thus, when the adjacent member pieces are displaced in the widthwise direction with respect to each other, the recessed part and the projected part abut on each other, thus the displacement of the adjacent member pieces in the widthwise direction with respect to each other can be suppressed. Further, at this time, the slanted faces of the recessed part and the projected part that are slanted with respect to the widthwise direction abut on each other, thus a slight displacement is allowed. Consequently, the connecting part can bend and tensile stress can be reduced, thereby preventing damage to the connecting part.

DETAILED DESCRIPTION OF THE EXEMPLARY EMBODIMENTS

The following will explain a curvature regulating member and a power supply device according to one embodiment of the present invention in reference to the drawings.

Figure 1:
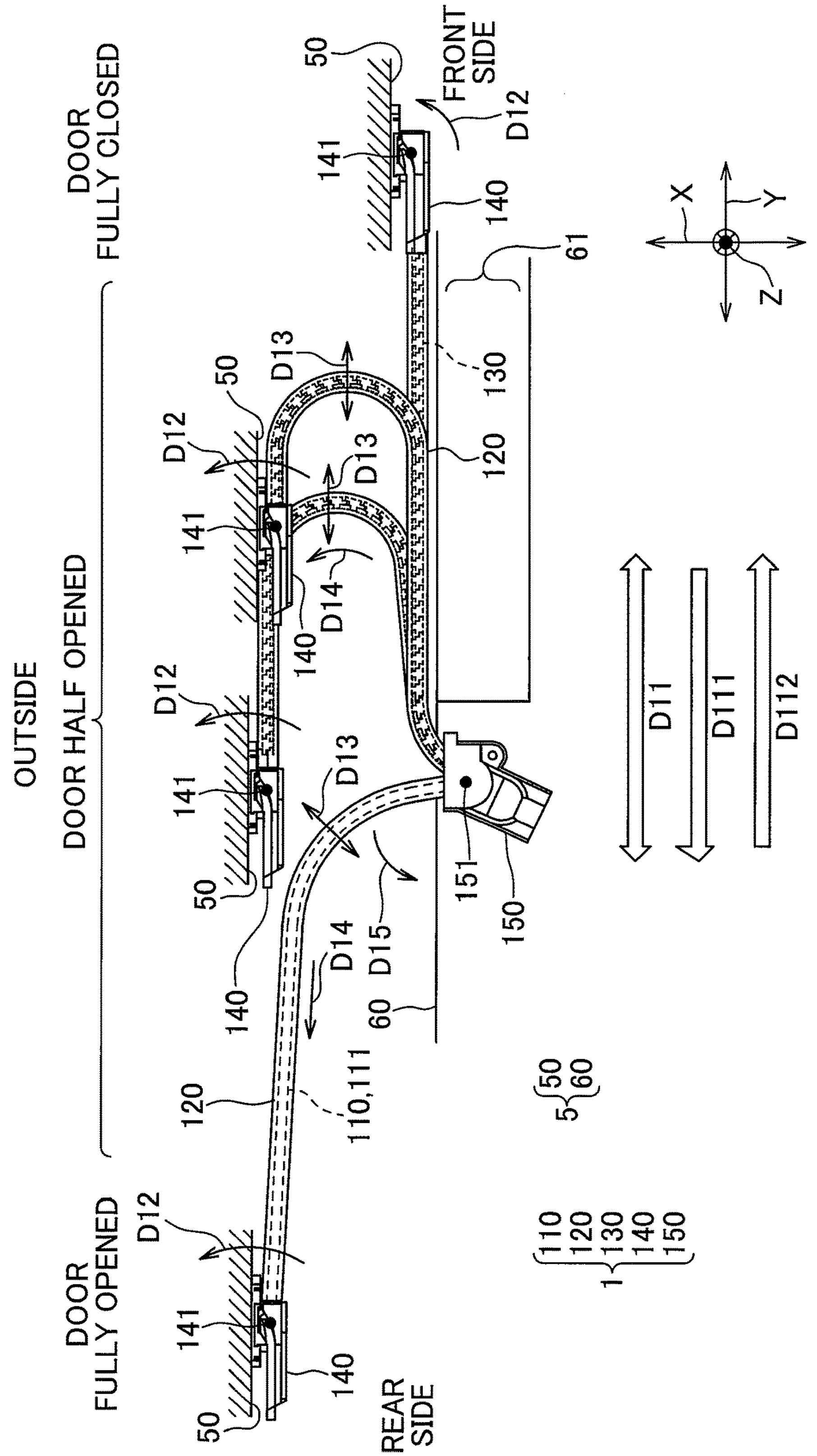
FIG. 1 is a diagram showing a power supply device applied with a curvature regulating member according to one embodiment of the present invention.

FIG. 1 is a diagram showing a power supply device applied with a curvature regulating member according to one embodiment of the present invention. The power supply device 1 of this embodiment is configured to be mounted to a vehicle 5. The power supply device 1 is configured to supply electrical power from a power source (not shown)

arranged at a vehicle body 60 side to an electronic device (not shown) arranged at a sliding door 50 (sliding member) via a wire harness 110. In FIG. 1, a right side corresponds to a front side of the vehicle 5, a left side corresponds to a rear side of the vehicle 5, an upper side corresponds to outside of the vehicle 5, and a lower side corresponds to inside of the vehicle 5. That is, in the drawings, an X direction corresponds to a right-left side of the vehicle 5, a Y direction corresponds to a front-rear direction of the vehicle 5, and a Z direction corresponds to an up-down direction of the vehicle 5.

The power supply device 1 includes the wire harness 110, a corrugated tube 120, a curvature regulating member 130, a door-side holding part 140 and a vehicle-body-side holding part 150. The wire harness 110 is constituted of a plurality of electric wires 111 bundled together. The corrugated tube 120 is a flexible tube made of resin. A portion of the wire harness 110 between the vehicle body 60 and the sliding door 50 is passed through the corrugated tube 120.

In addition to a power supply line for supplying power, the electric wires 111 may include a signal line for transferring electrical signal between a control unit (not shown) provided to the vehicle body 60 and the electronic devices (not shown) provided to the sliding door 50. The curvature regulating member 130 is arranged between an inner face of the corrugated tube 120 and the wire harness 110 and arranged along the wire harness 110 so as to surround the wire harness 110 in a circumferential direction. The curvature regulating member 130 will be explained later in more detail.

One end of the corrugated tube 120 on the sliding door 50 side is held by the door-side holding part 140 so as to be swingable on the X-Y plane around a door-side swing axis 141 arranged in the Z direction. The door-side holding part 140 is fixed to the sliding door 50. The door-side swing axis 141 provided to the door-side holding part 140 is parallel to the sliding door 50 and orthogonal to an opening and closing direction D11 of the sliding door 50 (i.e., the Y direction, which is the front-rear direction of the vehicle 5).

Through the holding of the corrugated tube 120 by the door-side holding part 140, a portion of the wire harness 110 on the sliding door 50 side is held so as to be swingable on the X-Y plane around the door-side swing axis 141. The sliding door 50 side of the wire harness 110 exits from the one end of the corrugated tube 120 on the sliding door 50 side. The wire harness 110 is further passed through a passage (not shown) inside the door-side holding part 140 and exits from this door-side holding part 140, and then extends to the electronic device on the sliding door 50.

Another end of the corrugated tube 120 on the vehicle body 60 side is held by the vehicle-body-side holding part 150 so as to be swingable on the X-Y plane around a vehicle-body-side swing axis 151 arranged in the Z direction. The vehicle-body-side holding part 150 is fixed to the vehicle body 60. The vehicle-body-side swing axis 151 provided to the vehicle-body-side holding part 150 is parallel to the sliding door 50 and orthogonal to the opening and closing direction D11 of the sliding door 50.

Through the holding of the corrugated tube 120 by the vehicle-body-side holding part 150, a portion of the wire harness 110 on the vehicle body 60 side is held so as to be swingable on the X-Y plane around the vehicle-body-side swing axis 151. The vehicle body 60 side of the wire harness 110 exits from the another end of the corrugated tube 120 on the vehicle body 60 side, is passed through a passage (not shown) inside the vehicle-body-side holding part 150, exits from this vehicle-body-side holding part 150, and then extends to the power source and the control unit on the vehicle body 60.

As shown in FIG. 1, when the sliding door 50 is fully closed, the door-side holding part 140 is located nearer the front side of the vehicle 5 than the vehicle-body-side holding part 150. And, the corrugated tube 120, and thus the wire harness 110 located inside thereof, extends substantially linearly between the vehicle-body-side holding part 150 and the door-side holding part 140.

When the sliding door 50 is being opened in an opening direction D111 heading to the rear side of the vehicle 5, the one end of the corrugated tube 120 on the sliding door 50 side swings as described below at an initial stage of the opening of the sliding door 50. That is, when the sliding door 50 is fully closed, the one end of the corrugated tube 120 on the sliding door 50 is positioned on the vehicle-body-side holding part 150 side (i.e., positioned toward the rear side) with respect to the door-side swing axis 141. When the sliding door 50 opens, the one end of the corrugated tube 120 swings on the X-Y plane around the door-side swing axis 141 toward the front side, and when the sliding door 50 is half opened, the one end of the corrugated tube 120 is positioned on the side more distant from the vehicle-body-side holding part 150 than the door-side swing axis 141 (i.e., positioned nearer the front side than the door-side swing axis 141). The door-side holding part 140 is provided with a coil spring to enhance this swinging motion. This coil spring biases the one end of the corrugated tube 120 on the sliding door 50 side toward a bias direction D12.

Due to the above-described swinging motion at the initial stage of the opening of the sliding door 50, the wire harness 110 located inside the corrugated tube 120 is curved as described below during the subsequent movement of the sliding door 50 toward the opening direction D111, i.e., when the sliding door 50 is half opened. That is, as shown in FIG. 1, the wire harness 110 is curved from the vehicle-body-side holding part 150 to the door-side holding part 140 toward outside the vehicle body 60 so as to be convexed toward the front side of the vehicle and so as to form a U-like shape on the X-Y plane.

In the following, the wire harness 110 located inside the corrugated tube 120 may simply be called the wire harness 110.

During the movement of the sliding door 50 to the opening direction D111, an arm of the U-like shape of the wire harness 110 on the sliding door 50 side is brought to linearly extend to the front side of the vehicle 5 by the bias force in the bias direction D12 produced at the door-side holding part 140. Due to the behavior of these respective parts and the later-described function of the curvature regulating member 130, the U-like shape of the wire harness 110 on the X-Y plane is arranged.

As the sliding door 50 moves to the opening direction D111, the arm of the U-like shape of the wire harness 110 on the sliding door 50 becomes elongated, and the arm of the U-like shape of the wire harness 110 on the vehicle body 60 side becomes shortened. When the arm on the vehicle body 60 side has become short for a certain degree, one end of the wire harness 110 on the vehicle body 60 side swings in a swing direction D15 toward the rear side of the vehicle 5. Then, in this condition, the sliding door 50 moves to the opening direction D111 and reaches to the fully opened state.

When the sliding door 50 is being closed in a closing direction D112 from this fully opened state, the wire harness 110 undergoes reverse behavior of the above-described behavior in the opening of the sliding door 50, as described below. Firstly, at an initial stage of the closing operation of the sliding door 50, the one end of the wire harness 110 on the vehicle body 60 side swings in a reverse direction of the swing direction D15, thereby the wire harness 110 forms the U-like shape on the X-Y plane. After that, the sliding door 50 continues to move to the closing direction D112, and when the arm of the U-like shape on the sliding door 50 side has become short for a certain degree, an another end of the wire harness 110 on the sliding door 50 side swings in a manner as described below. That is, at this stage, the another end of the wire harness 110 on the sliding door 50 side swings toward the rear side of the vehicle 5 in the reverse direction of the bias direction D12, against the bias force at the door-side holding portion 140. Then, in this condition, the sliding door 50 moves to the closing direction D112 and reaches to the fully closed state with the wire harness 110 extended in a linear fashion.

An end of a floor of the vehicle body 60 on the sliding door 50 side is lowered for one step to provide a step 61 to allow a passenger to step on it when getting into the vehicle. During the opening and closing of the sliding door 50, the arm of the U-like shape of the wire harness 110 on the vehicle body 60 side as described above passes in vicinity of the step 61 on the X-Y plane.

Generally speaking, in the field of a power supply device to be mounted to a sliding door of a vehicle, there is a demand for reduction of a swelling part of a wire harness swelled toward the vehicle body side when the wire harness is curved during the opening and closing of the sliding door. Thus, in order to regulate curvature that causes such swelling of the wire harness 110 toward the vehicle-body 60 side, the present embodiment provides the curvature regulating member 130 configured to be arranged along the wire harness 110. This curvature regulating member 130 limits the curvature on the X-Y plane of the wire harness 110. Specifically, the curvature regulating member 130 allows curvature with one side in a widthwise direction D13 (i.e., the rear side of the vehicle 5, in this embodiment) being arranged inside. The curvature regulating member 130 on the other hand regulates (limits) curvature with another side in the widthwise direction D13 (i.e., the front side of the vehicle 5, in this embodiment) being arranged inside, so as not to curve more than a predetermined limit state. Herein, the widthwise direction D13 is orthogonal to both of a longitudinal direction D14 of the wire harness 110 and the Z direction, i.e., a height direction perpendicular to the X-Y direction.

Figure 2:
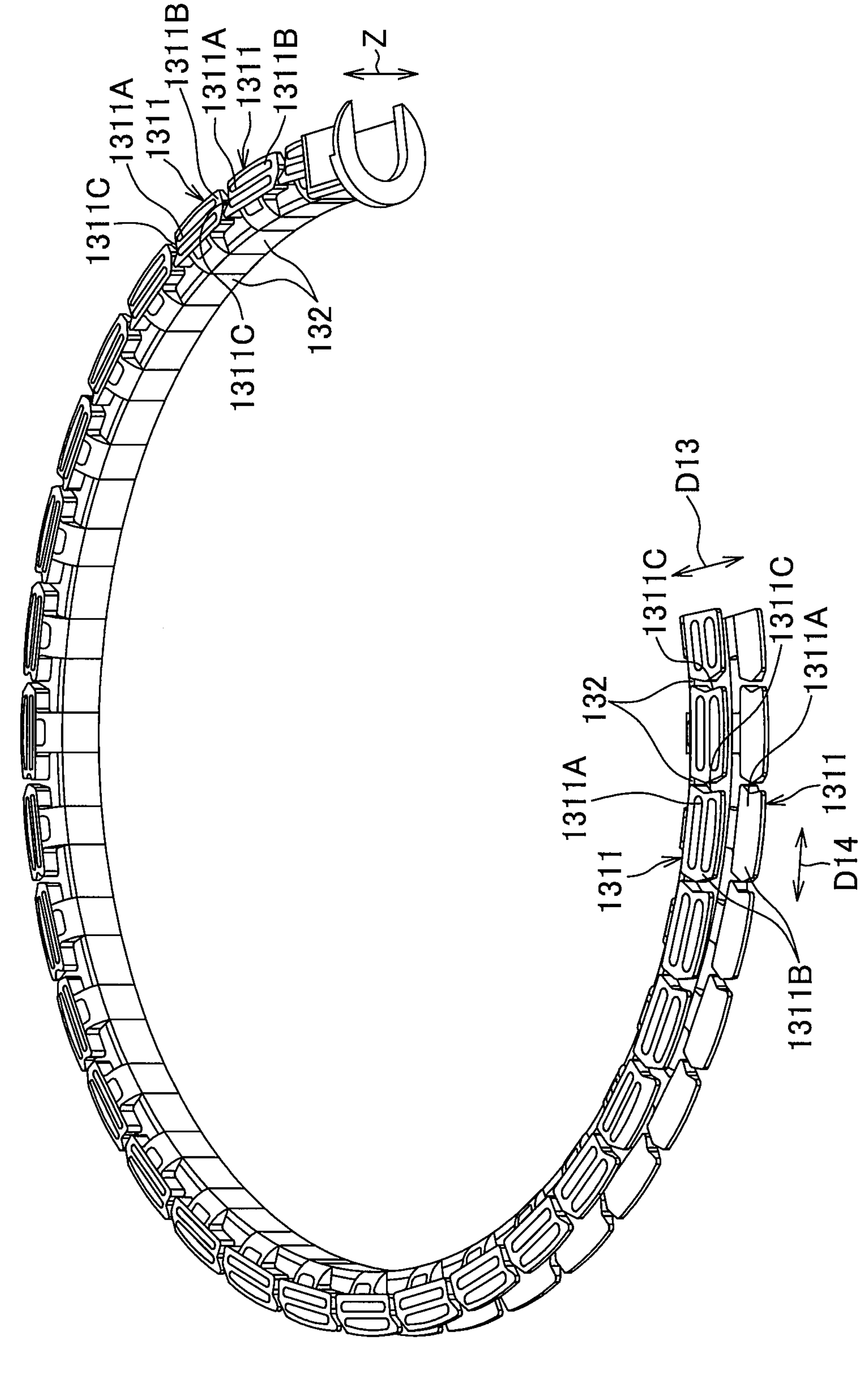
FIG. 2 is a perspective view of the curvature regulating member shown in FIG. 1.
Figure 3:
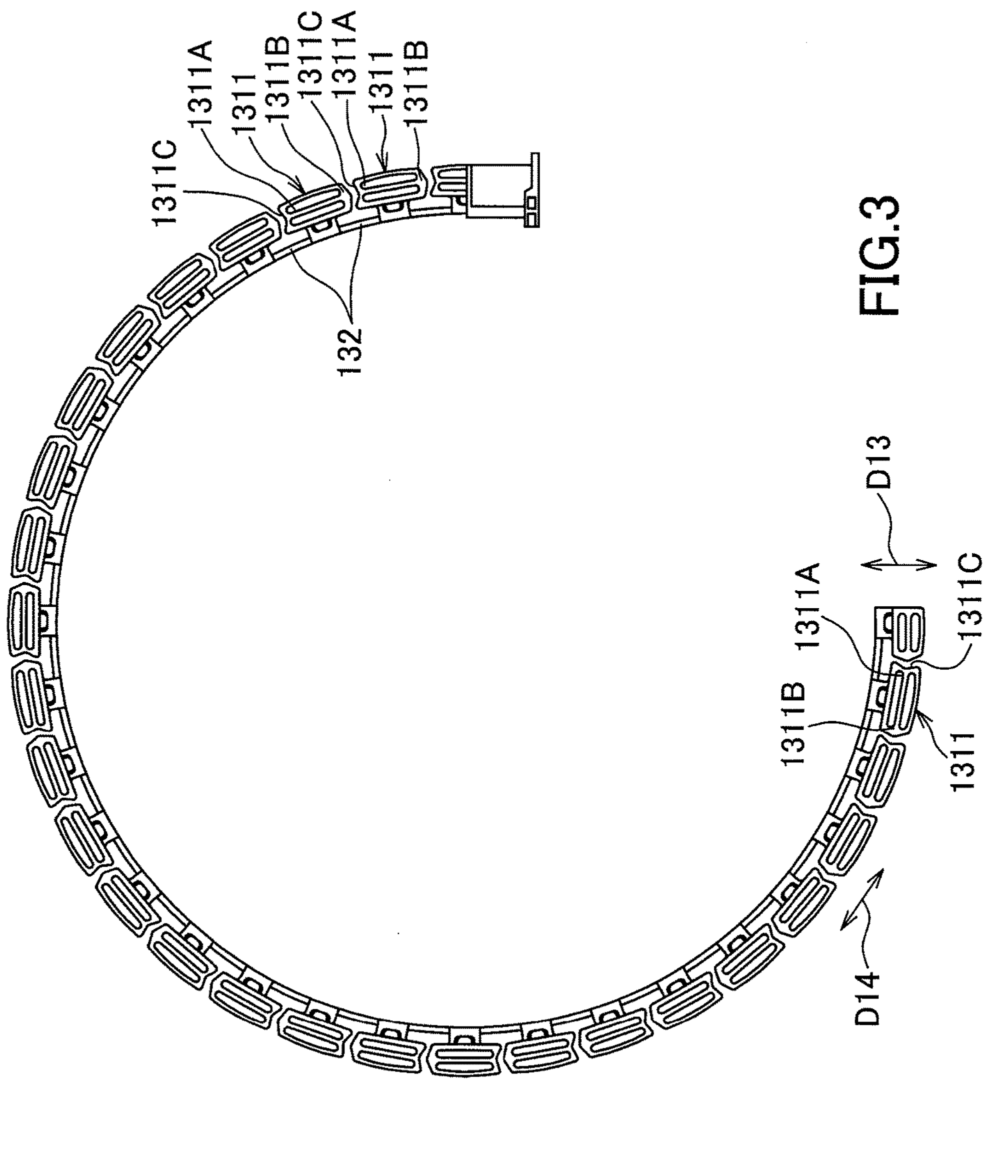
FIG. 3 is a plan view of the curvature regulating member shown in FIG. 1.
Figure 4:
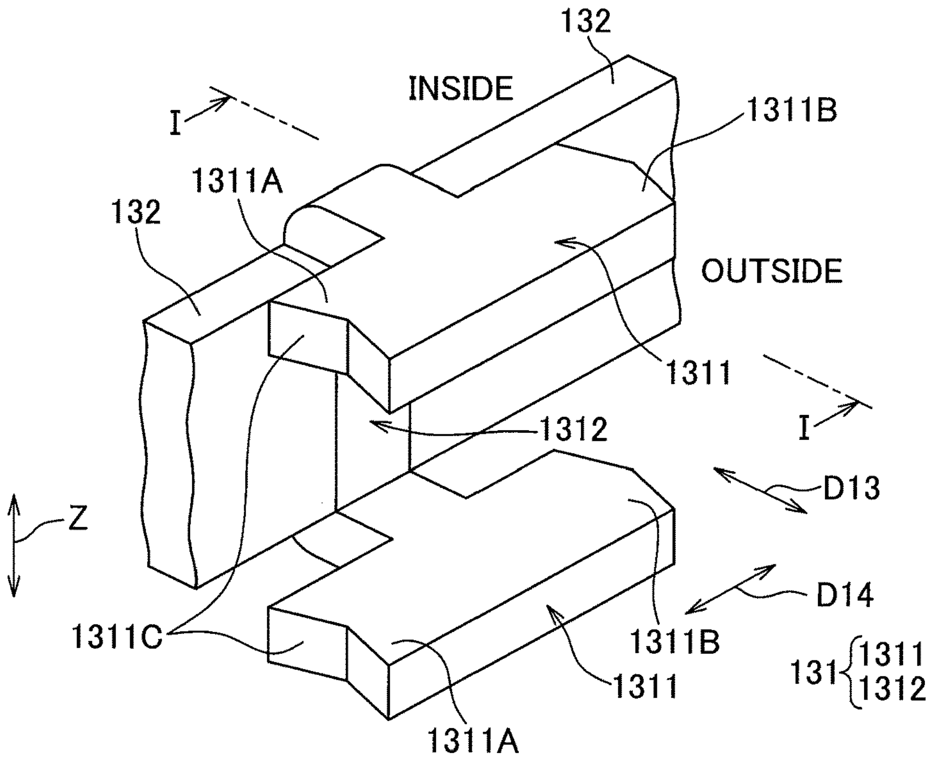
FIG. 4 is a perspective view showing one of a plurality of member pieces constituting the curvature regulating member shown in FIG. 1.
Figure 5:
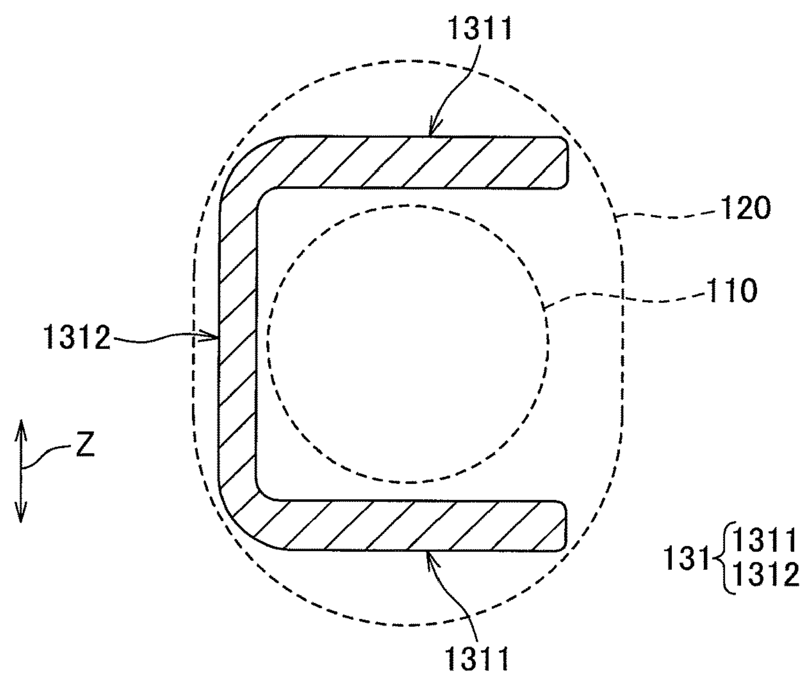
FIG. 5 is a cross-sectional view taken along the I-I line of FIG. 4.

FIG. 2 and FIG. 3 are a perspective view and a plan view of the curvature regulating member shown in FIG. 1, respectively. FIG. 4 is a perspective view showing one of a plurality of member pieces 131 constituting the curvature regulating member shown in FIG. 1. FIG. 5 is a cross-sectional view taken along the I-I line of FIG. 4.

As shown in FIG. 5, this curvature regulating member 130 is arranged between the inner face of the corrugated tube 120 and the wire harness 110 and arranged along the wire harness 110 so as to circumferentially surround the wire harness 110 to guide the curvature of the wire harness 110. The curvature regulating member 130 has substantially the same length as the corrugated tube 120.

The curvature regulating member 130 includes the plurality of member pieces 131 aligned along the wire harness 110 and a flexible connecting part 132 connecting adjacent member pieces 131 to each other. In this embodiment, the plurality of member pieces 131 and the connecting part 132 are integrally molded from a resin. The plurality of member pieces 131 is provided in line along the longitudinal direction D14 of the wire harness 110. The plurality of connecting parts 132 is flexible members arranged along the wire harness 110 so as to be positioned inside the curved shape of the plurality of member pieces 131. The adjacent member pieces 131 are connected only by the connecting part 132. This allows one of the adjacent member pieces 131 to be swingable around the connecting part 132 with respect to another one of the adjacent member pieces 131.

As shown in FIG. 2 to FIG. 5 as a representative example, each of the plurality of member pieces 131 includes a pair of opposed walls 1311 arranged opposed to each other so as to sandwich the wire harness 110 between each other, and a connecting wall 1312 connecting the pair of opposed walls 1311 together. With these three walls, each member piece 131 has a cross-section, which intersects with the longitudinal direction D14 of the wire harness 110, that is formed into a substantially C-like shape, as shown in FIG. 5.

The pair of opposed walls 1311 is provided in a manner opposed to each other in the Z direction. Each of the pair of opposed walls 1311 has a substantially T-like shape in a planar view, as shown in FIG. 3 and FIG. 4. A part of the T-like shape corresponding to a horizontal bar of the letter "T" and extending in the longitudinal direction D14 of the wire harness 110, is formed broad, and a part of the T-like shape corresponding to a vertical bar of the letter "T" and extending in the widthwise direction D13, is formed narrow and short. A basal portion of the narrow part of each T-like shaped opposed wall 1311 is connected to the connecting wall 1312. The connecting wall 1312 connects these narrow parts to each other and extends in the Z direction.

Each of the pair of opposed walls 1311 includes a first protrusion 1311A protruding toward an adjacent member piece 131 located on one side in the longitudinal direction D14 and a second protrusion 1311B (projected part) protruding toward an adjacent member piece 131 on the other side in the longitudinal direction D14. The first protrusion 1311A is provided with a recessed part 1311C recessed toward a direction away from the adjacent member piece 131 located on the one side. The recessed part 1311C includes a planar slanted face extending away from the adjacent member piece 131 located on the one side in the longitudinal direction D14 as leaving from both ends of the recessed part 1311C in the widthwise direction D13 that is perpendicular to both of the longitudinal direction D14 and the Z direction, i.e., the height direction perpendicular to the X-Y plane.

A distal end of the second protrusion 1311B is provided with a planar slanted face extending toward the adjacent member piece 131 located on the other side in the longitudinal direction D14 as leaving from both ends of the second protrusion 1311B in the widthwise direction D13.

Figure 6:
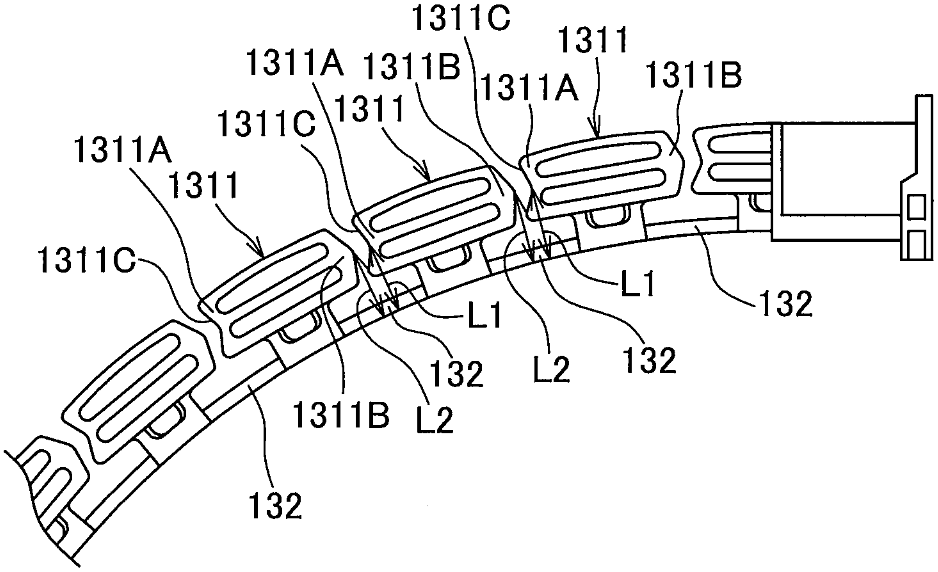
FIG. 6 is a diagram showing the curvature regulating member of FIG. 1 and illustrating a state in which curvature with a connecting part side in a widthwise direction being inside is allowed.
Figure 7:
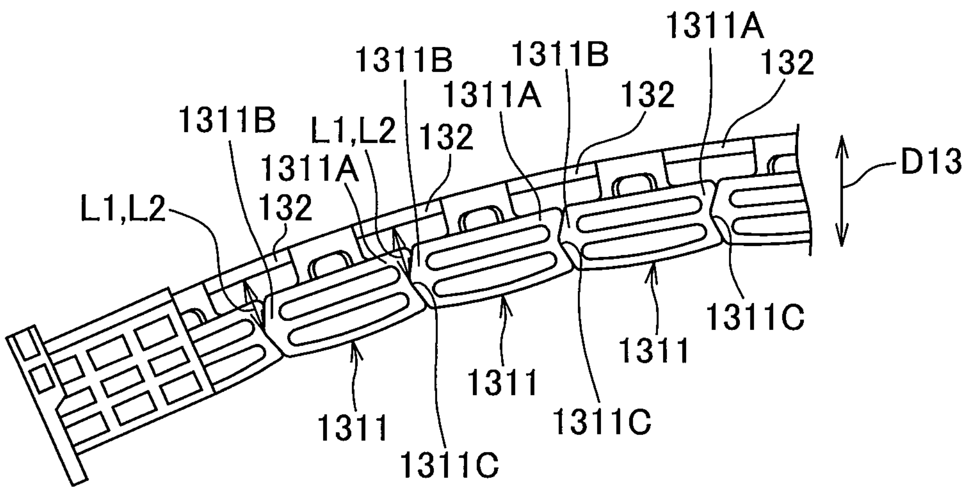
FIG. 7 is a diagram showing the curvature regulating member of FIG. 1 and illustrating a state in which curvature with the connecting part side in the widthwise direction being outside is limited.

FIG. 6 illustrates the curvature regulating member 130 in a state in which curvature with the connecting part 132 side in the widthwise direction D13 being inside, is allowed. FIG. 7 illustrates the curvature regulating member 130 in a state in which curvature with the connecting part 132 side in the widthwise direction D13 being outside, is limited.

As shown in FIG. 6, for the curvature with the connecting part 132 side in the widthwise direction D13 being inside, the adjacent member pieces 131 of the plurality of member pieces 131 that are located at the curved portion are separated from each other with the connecting part 132 bent, thereby allowing the curvature regulating member 130 to curve. Consequently, the curvature of the wire harness 110 with the connecting part 132 side in the widthwise direction D13 being inside, is allowed.

On the other hand, as shown in FIG. 7, for the curvature with the connecting part 132 side in the widthwise direction D13 being outside, the adjacent member pieces 131 of the plurality of member pieces 131 that are located at the curved portion approach each other and abut on each other, thereby inhibiting the curvature regulating member 130 to curve more than a limit state. This state, in which the adjacent member pieces 131 located at the curved portion are abutted on each other in the longitudinal direction D14, corresponds to the limit state of the curvature with the connecting part 132 side in the widthwise direction D13 being outside. The curvature regulating member 130 cannot curve, with the connecting part 132 side in the widthwise direction D13 being outside, more than the limit state. Consequently, the curvature of the wire harness 110 with the connecting part 132 side in the widthwise direction D13 being outside, is regulated so as not to curve more than the limit state of the curvature regulating member 130.

In addition, at this time, the second protrusion 1311B of one of the adjacent member pieces 131 is inserted into the recessed part 1311C of the other one of the adjacent member pieces 131, and the slanted face of the recessed part 1311C formed at the first protrusion 1311A abuts on the slanted face of the second protrusion 1311B. The slanted faces of the recessed part 1311C and the second protrusion 1311B are slated with respect to both of the longitudinal direction D14 and the widthwise direction D13.

Consequently, as shown in FIG. 7, even if the curvature regulating member 130 is applied with load in the widthwise direction D13, the recessed part 1311C of the first protrusion 1311A and the second protrusion 1311B of the adjacent member pieces 131 contact each other in the widthwise direction D13, thereby suppressing the displacement of the member pieces 131 with respect to each other in the widthwise direction D13. Thus, the rigidity of the curvature regulating member 130 can be improved.

Furthermore, it is configured such that the abutment of the slanted faces of the recessed part 1311C and the second protrusion 1311B with respect to each other allows for a slight displacement. Thus, the connecting part 132 can bend to reduce tensile stress, thereby preventing damage to the connecting part 132.

Figure 8:
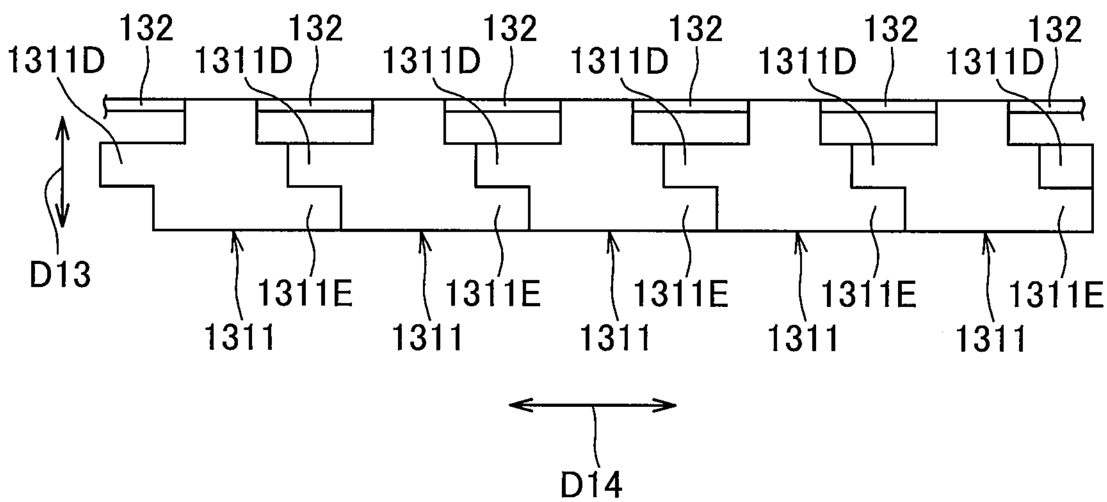
FIG. 8 is a partial enlarged view of a curvature regulating member as a comparative example.
Figure 9:
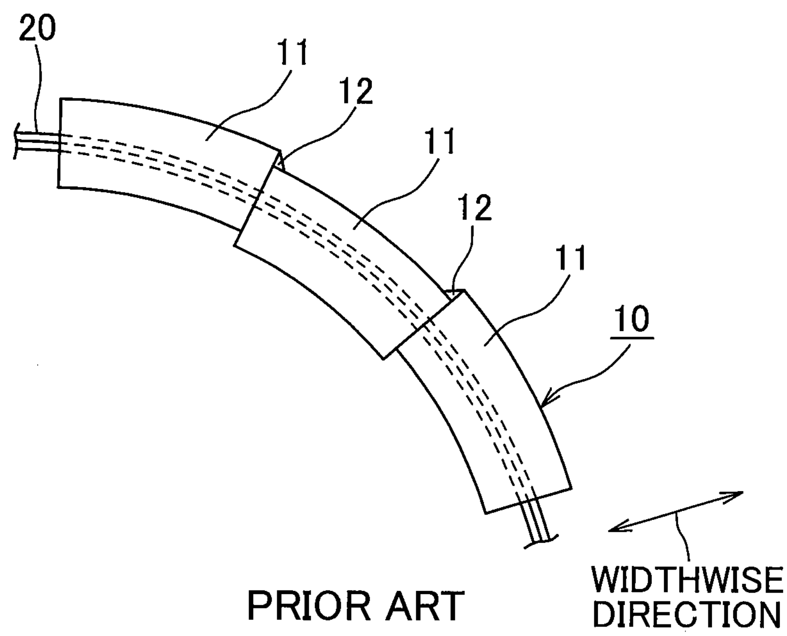
FIG. 9 is a diagram illustrating a drawback of a conventional curvature regulating member.

Following will explain the above-described advantageous effects in more detail in comparison with a comparative example shown in FIG. 8. In FIG. 8, parts/elements similar to those of the present embodiment shown in FIG. 1 to FIG. 7 are denoted by the identical reference signs to omit detailed explanation thereof. In the comparative example, the opposed wall 1311 of the member piece 131 is provided with a third protrusion 1311D and a fourth protrusion 1311E. The third protrusion 1311D protrudes from inside of the curved shape of the member piece 131 toward an adjacent member piece 131 located on one side in the longitudinal direction D14. The fourth protrusion 1311E protrudes from outside of the curved shape of the member piece 131 toward an adjacent member piece 131 located on the other side in the longitudinal direction D14.

Similar to the present embodiment, in the comparative example, even if the curvature regulating member 130 is applied with load in the widthwise direction D13, the third protrusion 1311D and the fourth protrusion 1311E of the adjacent member pieces 131 contact each other in the widthwise direction D13, thereby suppressing the displacement of the member pieces 131 with respect to each other in the widthwise direction D13. However, in the comparative example, the contact faces of the third protrusion 1311D and the fourth protrusion 1311E are perpendicular to the widthwise direction D13. Thus, the member pieces 131 cannot be displaced with respect to each other from the position in which the third protrusion 1311D and the fourth protrusion 1311E are contacted. Thus, stress may be applied on the connecting part 132.

In contrast, in the present invention, the contact faces of the recessed part 1311C and the second protrusion 1311B are the slanted faces slanted with respect to the widthwise direction D13. Thus, when the recessed part 1311C and the second protrusion 1311B are contacted, a slight displacement in the widthwise direction D13 is allowed, as described above. Consequently, the connecting part 132 can bend and the tensile stress can be reduced, thereby preventing the damage to the connecting part 132.

Furthermore, as shown in FIG. 6 and FIG. 7, the curvature regulating member 130 is arranged such that a distance L1 in the widthwise direction D13 between the connecting part 132 and a bottom point of the recessed part 1311C is equal to a distance L2 in the widthwise direction D13 between the connecting part 132 and an apex of the second protrusion 1311B. Consequently, when the curvature becomes equal to or more than the predetermined limit state and the second protrusion 1311B is inserted in and contacts the recessed part 1311C, unwanted stress is unlikely to be applied to the connecting part 132, thereby preventing damage to the connecting part 132.

In the above-described embodiment, the curvature regulating member 130 is arranged such that the distances L1 and L2 are equal, as shown in FIG. 6 and FIG. 7. However, the present invention is not limited to this. That is, the distances L1 and L2 may be different from each other.

Furthermore, in the above-described embodiment, the connecting part 132 is arranged so as to connect one ends in the widthwise direction D13 of the adjacent member pieces 131. However, the present invention is not limited to this. That is, the connecting part 132 may be arranged so as to connect central portions in the widthwise direction D13 of the adjacent member pieces 131.

Furthermore, in the above-described embodiment, the sliding door 50 is considered as an example of the sliding member. However, the present invention is not limited to this. That is, the sliding member may be a sliding seat.

Furthermore, in the above-described embodiment, single recessed part 1311C is provided to single member piece 131. However, the present invention is not limited to this. That is, two or more recessed parts 1311C may be provided to single member piece 131. In this case, the distal end of the second protrusion 1311B may be provided with two or more projected parts which are configured to be inserted into the two or more recessed parts 1311C respectively.

The present invention is not limited to the embodiments described herein. That is, various changes and modifications can be made and implemented without departing from the scope and spirit of the present invention.

LIST OF REFERENCE SIGNS

1 power supply device
5 vehicle
50 sliding door
60 vehicle body
110 wire harness
130 curvature regulating member
131 member piece
132 connecting part
1311B second protrusion (projected part)
1311C recessed part D13 widthwise direction D14 longitudinal direction L1 distance (distance in the widthwise direction between the connecting part and the bottom point of the recessed part)

L2 distance (distance in the widthwise direction between the connecting part and the apex of the projected part)

Z up-down direction (height direction)

What is claimed is:

1. A curvature regulating member comprising:

a plurality of member pieces to be arranged along a wire harness; and a flexible connecting part connecting adjacent member pieces, wherein the adjacent member pieces are configured to contact each other and thereby regulate curvature of the wire harness on a predetermined plane, wherein each of the member pieces includes a recessed part and a projected part, the recessed part being recessed in a direction away from an adjacent member piece located on one side in a longitudinal direction of the wire harness, the projected part being configured to be inserted in the recessed part provided to an adjacent member piece located on another side in the longitudinal direction of the wire harness, wherein the recessed part includes a slanted face extending away from the adjacent member piece located on the one side in the longitudinal direction as leaving from both ends of the recessed part in a widthwise direction, the widthwise direction being perpendicular to both of the longitudinal direction and a height direction perpendicular to the plane, and wherein the projected part includes a slanted face extending toward the adjacent member piece located on the another side in the longitudinal direction as leaving from both ends of the projected part in the widthwise direction.

2. The curvature regulating member according to claim 1, wherein a distance in the widthwise direction between the connecting part and a bottom point of the recessed part is equal to a distance in the widthwise direction between the connecting part and an apex of the projected part.

3. A power supply device configured to electrically connect a vehicle body and a sliding member that are included in a vehicle, comprising:

a wire harness to be wired between the vehicle body and the sliding member; and the curvature regulating member according to claim 1 arranged along the wire harness.

4. A power supply device configured to electrically connect a vehicle body and a sliding member that are included in a vehicle, comprising:

a wire harness to be wired between the vehicle body and the sliding member; and the curvature regulating member according to claim 2 arranged along the wire harness.

* * * * *